UNITED STATES PATENT OFFICE.

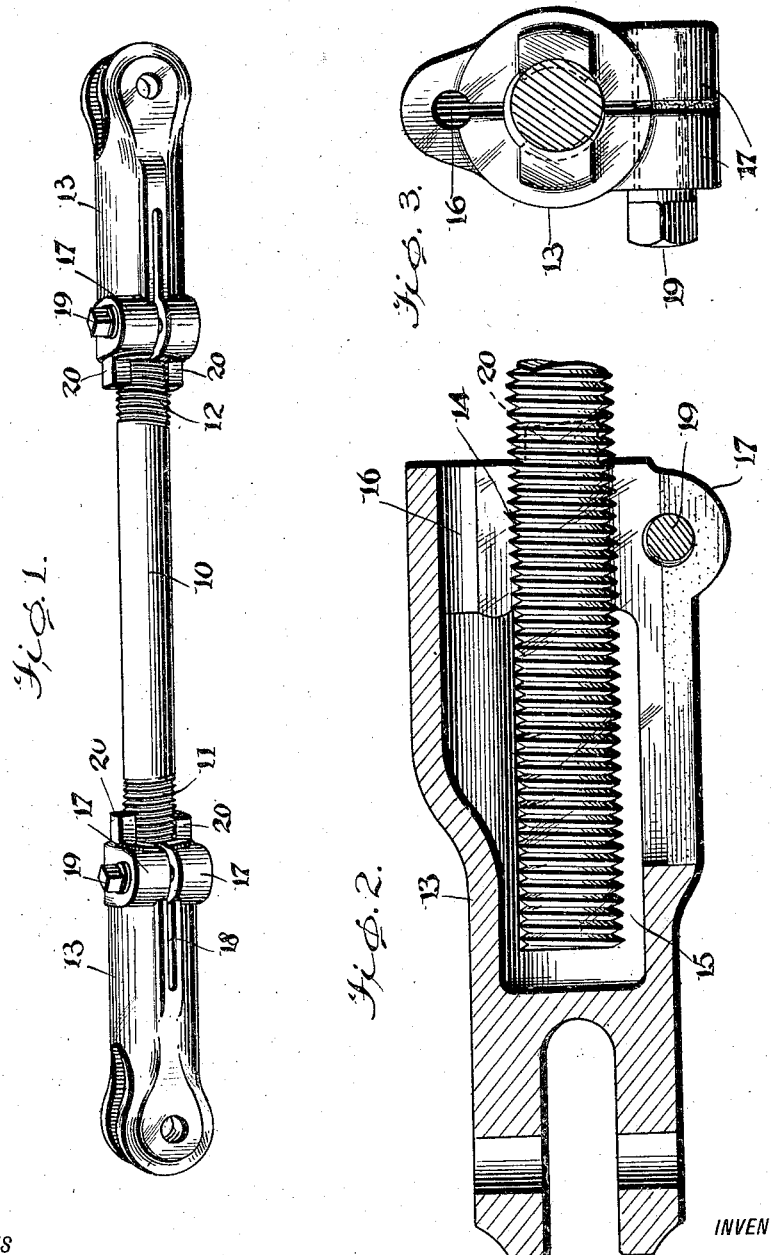

ROBERT C. McARTHUR, OF SAND SPRINGS, OKLAHOMA, ASSIGNOR TO WALTER O. FREDRIKSON, A. EDWARD KRIEGER, AND ROBERT C. McARTHUR, TRUSTEES, ALL OF SALAMANCA, NEW YORK.

BRAKE-ROD ADJUSTER.

1,423,235.  Specification of Letters Patent.  Patented July 18, 1922.

Application filed April 13, 1921. Serial No. 461,156.

*To all whom it may concern:*

Be it known that I, ROBERT C. MCARTHUR, a citizen of the United States, and a resident of Sand Springs, in the county of Tulsa and State of Oklahoma, have invented certain new and useful Improvements in Brake-Rod Adjusters, of which the following is a specification.

My present invention relates generally to brake rod adjusters and more particularly to a device of this nature in the form of an adjustable turnbuckle connection and my object among others is the provision of a turnbuckle connection involving a turnbuckle rod oppositely threaded at its ends and normally adjusted and clamped within socket members the latter of which in particular are so formed as to permit of ready adjustment when the clamping means are released.

My invention further aims to avoid the use of lock nuts and provide against the collection of dirt, rust and the like between the threadedly engaged portions of the turnbuckle rod and the socket members so as to thus permit of ready quick adjustment when this becomes necessary.

In the accompanying drawing which illustrates my present invention and forms a part of this specification, Figure 1 is a perspective view of my improved brake rod adjuster complete, Figure 2 is an enlarged section taken lengthwise through one of the socket members and the adjacent portion of the turnbuckle rod, and Figure 3 is a sectional view through the turnbuckle rod adjacent to and looking at the inner end of one of the socket members.

Referring now to these figures my invention includes a turnbuckle rod 10 having oppositely threaded ends 11 and 12, and a pair of socket or connecting members 13, each threaded internally around and within its rod receiving bore 14 at the inner end of a lengthwise oil chamber 15 which may be fed with oil through a lengthwise opening 16. This opening 16 is formed parallel to the rod receiving bore 14 and at one side thereof, with its inner end communicating with the chamber 15 and its outer end opening through the inner end of the socket member, and with respect to the rod receiving bore 14, is diametrically opposed to a pair of adjacent facing lugs 17 upon opposite sides of a longitudinal slot 18 with which the inner end of each of the socket members 13 is provided. This slot 18 also extends through the rod receiving bore 14 to the oil feed opening 16, the lugs 17 being pierced by a clamping screw 19 which is headed at one end and threaded at its opposite end into one of the lugs so that by its action those portions of the socket member 13 lying upon opposite sides of the slot 18 may be rigidly clamped upon the entering end of the turnbuckle rod 10 in view of the flexibility permitted by virtue of the fact that portions of the slot 18 extend upon opposite sides of the rod receiving bore 14.

In addition to the foregoing, each of the socket members has diametrically opposed extensions 20 projecting from its inner end, each extension being threaded on its inner face so as to engage the threaded ends 11 of the turnbuckle rod 10 and scrape and clean the threads previous to their movement into the bore 14 of the socket member.

In practice the threaded ends 11 of the turn-buckle rod 10 are normally adjusted and clamped by virtue of the structure just above described within the socket members and, by virtue of the influence of oil within the chamber 15 of each socket member, the adjacent portions of the threaded ends 11 of the turnbuckle rod 10 are prevented from rusting so that by releasing the clamping screws 19 the rod 10 may be readily turned to shift the socket members 13 away from one another. Likewise by virtue of the thread clearing extensions 20, the rod 10 may be readily turned to draw the socket members 13 toward one another and at the same time prevent the entrance of dirt within each of the socket members.

By virtue of the clamping screws 19 and the particular manner in which they are mounted as well as the structure of the socket members providing for effective action of these screws it is obvious that after adjustment has been made with the screws loosened, they may be turned tight to effectively and rigidly clamp the threaded ends of the turnbuckle rod so as to avoid all danger of accidental displacement thereof as well as the necessity for lock nuts which the ordinary structure requires.

I claim:

1. In a brake rod adjuster, an adjusting rod, and bored and internally threaded socket members receiving the ends of said rod, having split clamping portions, and having oil chambers into which the rod ends also extend and oil feed openings in connection with said chambers.

2. In a brake rod adjuster, an adjusting rod having oppositely threaded ends, attaching members having split ends and threaded bores through said split ends, clamping lugs at one side of the bores, clamping screws working through the lugs, each attaching member having a lengthwise opening upon the diametrically opposite side of its rod receiving bore with respect to the said lugs, and each having a chamber alined with its bore and with which the said opening communicates.

3. In a brake rod adjuster, an adjusting rod having oppositely threaded ends, a pair of attaching members receiving the rod and each provided with a threaded bore and a lengthwise opening at one side of the bore and each provided with a lengthwise slot intersecting the opening at one side, lugs opposing one another at the opposite side of the slot, and a clamping screw operating through the said lugs.

4. In a brake rod adjuster, an adjusting rod having oppositely threaded ends, a pair of attaching members receiving the rod and each provided with a threaded bore and a lengthwise opening at one side of the bore and each provided with a lengthwise slot intersecting the opening at one side, lugs opposing one another at the opposite side of the slot, and a clamping screw operating through the said lugs, said socket member having an inner chamber at the inner end of its bore and with which the inner end of its said opening communicates.

ROBERT C. McARTHUR.